United States Patent [19]
Godbersen

[11] Patent Number: 5,158,315
[45] Date of Patent: Oct. 27, 1992

[54] BUNK SUPPORTING ASSEMBLY FOR BOAT TRAILERS

[76] Inventor: Byron L. Godbersen, Lake LaJune Estates, Ida Grove, Iowa 51445

[21] Appl. No.: 661,333

[22] Filed: Feb. 25, 1991

[51] Int. Cl.$^5$ .............................................. B60P 3/10
[52] U.S. Cl. .............................. 280/414.1; 414/462; 414/534
[58] Field of Search .................... 280/414.1; 414/483, 414/494, 534, 462

[56] References Cited

U.S. PATENT DOCUMENTS

| | | | |
|---|---|---|---|
| 3,077,276 | 2/1963 | Thwreatt | 414/534 |
| 3,122,245 | 2/1964 | MacKusick et al. | 414/483 |
| 3,131,902 | 5/1964 | Zak, Jr. | 280/414.1 |
| 3,993,324 | 11/1976 | Carrick | 280/414.1 |
| 4,779,887 | 10/1988 | Briggs | 280/414.1 |
| 5,002,299 | 3/1991 | Firehammer et al. | 280/414.1 |
| 5,060,963 | 10/1991 | Godbersen | 280/414.1 |
| 5,076,603 | 12/1991 | Godbersen | 280/414.1 |

FOREIGN PATENT DOCUMENTS 1384723 11/1964 France .............................. 280/414.1

Primary Examiner—Mitchell J. Hill
Attorney, Agent, or Firm—Henderson & Sturm

[57] ABSTRACT

In a boat trailer having a frame including a crossbar, and a pair of bunks for supporting a boat thereon, a support assembly for vertically adjustably supporting the bunks on the crossbar including a post unit connected to the crossbar, a bracket unit connected to the bunk, fastening means releasably connecting the post unit and the bracket unit for relative movement therebetween, and a jack screw unit connected between the post unit and the bracket unit for effecting incremental movement therebetween for adjustment of the bunks relative to the frame without the need of effecting a complete separation of the post unit and bracket unit by removal of the fastening means.

4 Claims, 2 Drawing Sheets

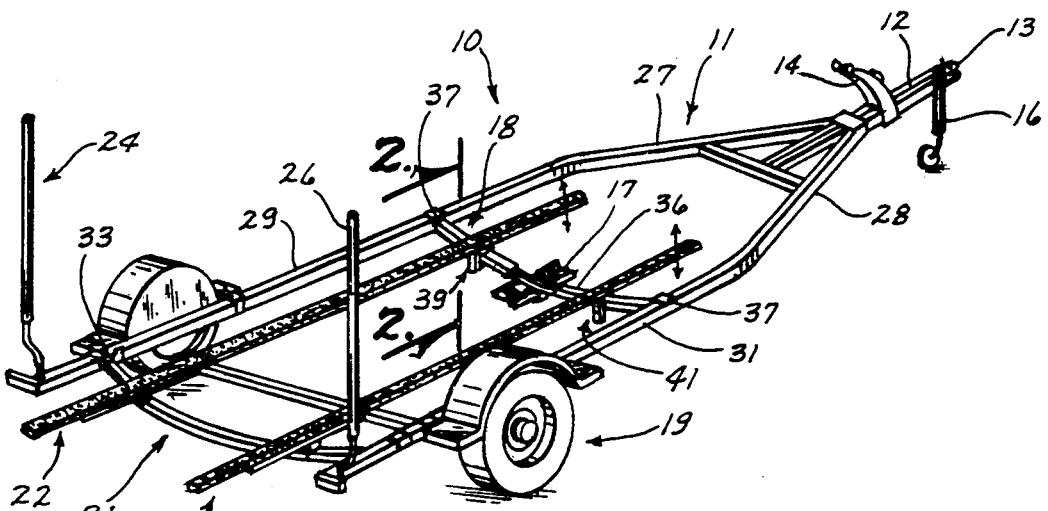
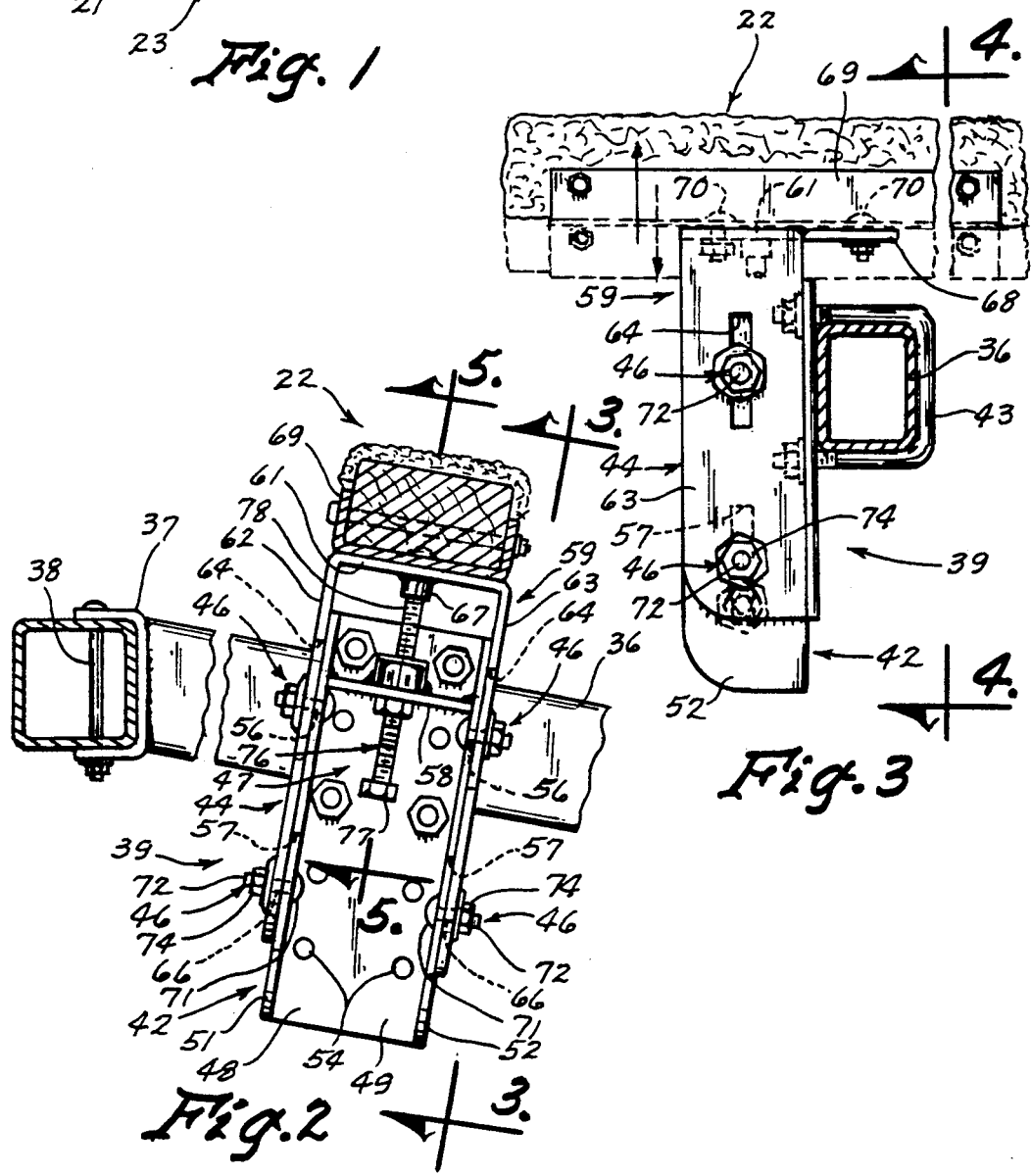

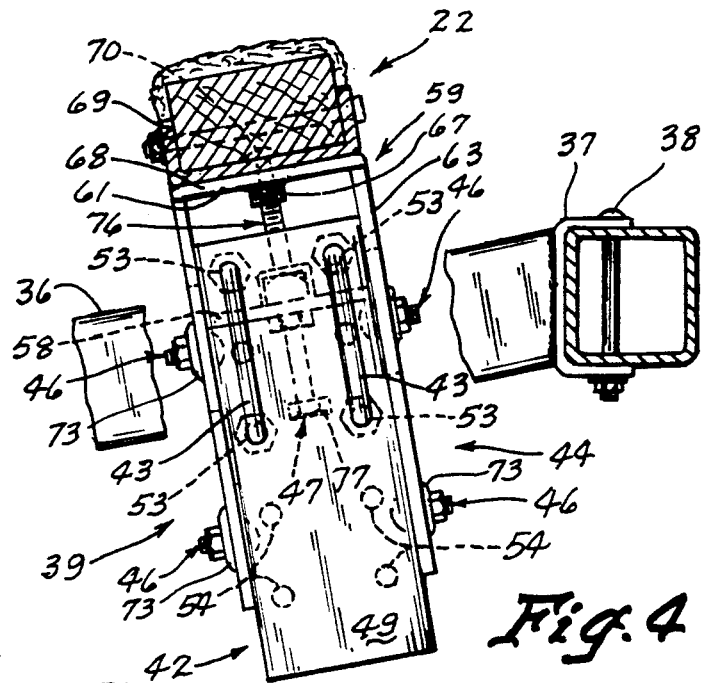
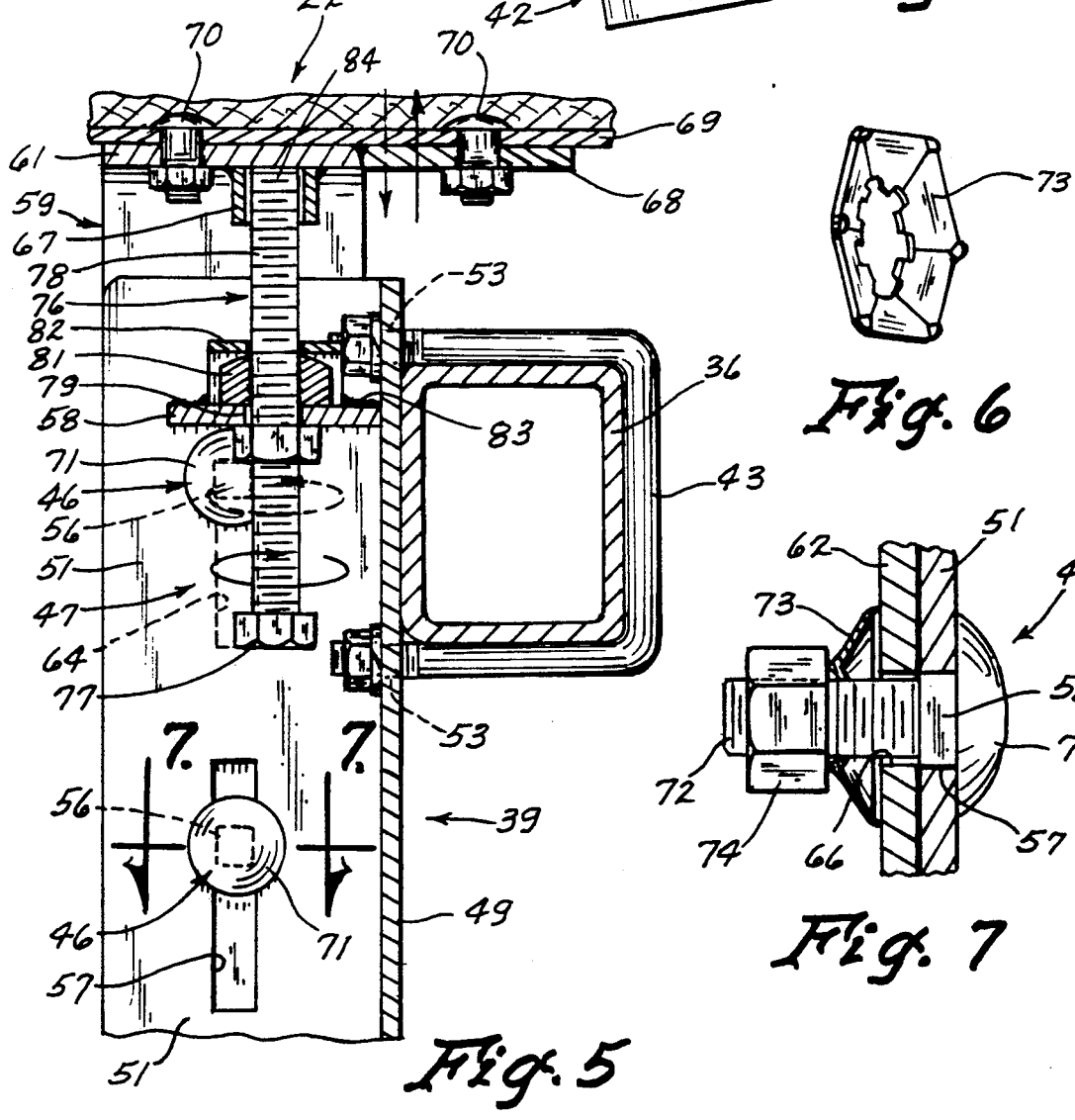

BUNK SUPPORTING ASSEMBLY FOR BOAT TRAILERS

TECHNICAL FIELD

The present invention relates to boat trailers in general, and in particular to supports for bunk-type trailers for transporting a variety of boats.

BACKGROUND ART

With an ever increasing number of different sized, shaped and weighted boats due to the increasing popularity of this industry, it is recognized that the trailer must securely support the boat carried thereby, and that the boat hull supporting elements quickly conform to the contour of the hull for proper distribution of the weight of the boat and to avoid localized stresses.

Adequate weight distribution for the massive hulls supported by these modern tandem-type boat trailers provides relative ease of maneuverability during loading and launching, and steady towing characteristics. Conventional means for supporting a boat hull comprises at least a pair of elongated bunk units extended longitudinally of the trailer frame and with each bunk unit spaced equidistantly outwardly of the longitudinal axis of the frame. The bunk units are normally supported fore and aft the frame by a support assembly mounted on a crossbar or to the frame and comprising at least one upright element which is vertically movable by means of a plurality of bolt holes, and having a clamp element at the top for attachment to the bunk unit, quite often in a pivotal manner. The upright element at times comprises a pair of telescopically arranged elements the lowermost fixed in place. Typical bunk supports are shown in U.S. Pat. No. 3,112,245 to MacKusick et al and U.S. Pat. No. 3,993,324 to Carrick.

DISCLOSURE OF THE INVENTION

In a boat trailer having a frame with at least a front crossbar, and having a pair of longitudinally extended, transversely spaced bunk units, a support assembly for each bunk unit mounted on the crossbar, each support assembly including telescopically connected upright members longitudinally adjustable by a jack screw unit without complete removal of fastening units for incremental adjustment of the spacing of the bunk unit above the trailer crossbar and frame.

More particularly, the improvement comprises a post element secured to the crossbar for lateral adjustment, a bracket element telescopically embracing the post element, both elements having a series of openings formed therein which are alignable to effect a changed position of the bracket element relative to the post element, fasteners for insertion through aligned openings for securing the two elements together in their varied relative positions, and a jack screw unit connected to both elements for moving the bracket element relative to the post element when the fasteners are loosened but not removed from the openings, thereby enabling a quick adjustment of the support assembly to effect in turn a quick adjustment of the position of the bunk supported thereby for proper support of the boat hull.

It is an object of the invention to provide an improved bunk supporting assembly for a boat trailer.

It is another object of this invention to provide a new and novel bunk supporting assembly for a more efficient adjustment of the bunk supporting assembly for positioning the bunks relative to a boat hull.

Yet another object of this invention is to provide an improved bunk supporting assembly capable of longitudinal adjustment without complete separation of any elements.

Still another object of this invention is the provision of an improved bunk supporting assembly utilizing telescoping elements and fastening units therefor, and utilizing further threaded elements capable of quickly adjusting the position of a bunk unit relative to its frame by minute increments, without complete separation of the fastening units.

BRIEF DESCRIPTION OF THE DRAWINGS

These and other attributes of the invention will become more clear upon a thorough study of the following description of a preferred embodiment of the invention, particularly when reviewed in conjunction with the accompanying drawings, wherein:

FIG. 1 is a perspective of a boat trailer embodying the present invention;

FIG. 2 is an enlarged rear elevational view taken partially in section along the line 2—2 in FIG. 1;

FIG. 3 is a side elevational view taken partially in section along the line 3—3 in FIG. 2;

FIG. 4 is a front elevational view taken partially in section along the line 4—4 in FIG. 3 and parts broken away for clarity of illustration;

FIG. 5 is a further enlarged vertical sectional view taken along the line 5—5 in FIG. 2;

FIG. 6 is a further enlarged, detail view of a lock washer; and

FIG. 7 is a sectional view taken along the line 7—7 in FIG. 5.

BEST MODE FOR CARRYING OUT THE INVENTION

Although not intended to be so limited, for convenience of illustration, the improved boat trailer bunk mounting system of this invention is shown in connection with a trailer for loading and supporting a low or shallow draft-type boat. The illustrated trailer construction enables the boat to be loaded directly from the water by backing the trailer down a ramp or incline and bringing the rearmost hull engaging bunk assemblies of the trailer into position close to the floating boat. The boat is then advanced into contact with the bunk assemblies and drawn forward into supporting engagement therewith and with the forward keel supporting structure for full engagement and support of the boat for purposes of transportation.

Referring now to the drawings, particularly FIG. 1, the boat trailer of this invention is illustrated generally at (10) and comprises a frame assembly (11) including a tongue (12) and hitch (13) for conventional attachment to a prime mover (not shown); a winch assembly (14) for detachable connection to a boat (not shown) to be transported thereby; a stand assembly (16) for supporting the frame assembly (11) in a horizontal condition; a front keel supporting assembly (17) pivotally mounted on a front crossbar assembly (18); a wheel and axle unit (19) for supporting the frame assembly (11) adjacent the rear end thereof; a rear crossbar assembly (21) pivotally connected to the frame assembly (11); a pair of bunk units (22) and (23) each secured in transversely spaced, parallel relation to the front and rear crossbar assemblies (18) and (21); and a pair of guide members (24),

(26) for guiding the boat to be transported by the trailer (10) onto and off of the trailer (10).

Let it be noted that the frame assembly (11) has an A-shape with converged portions of the frame assembly (11) forming the tongue (12), and with outwardly diverging frame members (27) and (28) including the fore part of the frame assembly (11), the rear frame members (29) and (31) extended parallel each other and to the longitudinal axis of the frame assembly (11). The rear crossbar assembly (21) comprises a slightly V-shaped crossbar (32) which has a pair of brackets (33), (34) connected at each outer end thereof for pivotal mounting to the respective rear frame members (29), (31).

The improvement comprises the front crossbar assembly (21) including a crossbar (36) (FIGS. 1 and 2) connected at each end (37) by a fastener (38) to a frame member (29), (31) and having a pair of improved support assemblies (39), (41) (FIGS. 1 and 2) for vertically adjustably supporting the bunk units (22), (23) respectively. As the assemblies (39), (41) are identical, only one (39) will be described.

The support assembly (39) comprises generally a post unit (42) mounted in a laterally adjustable manner by a U-bolt (43) (FIG. 3) to the crossbar (36); a bracket unit (44) telescopically adjustably mounted for longitudinal movement on the post unit (42) by fastening units (46); and a threaded jack screw unit (47) (FIG. 2 and 5) secured to the post unit (42) and engageable with the bracket unit (44) for incrementally moving the bracket unit (44) relative to the post unit (42) for adjusting the height of the bunk unit (22) relative to the frame member (27) and the front crossbar (36) (FIG. 2).

More particularly, the post unit (42) comprises a U-shaped post (48) having a front panel (49) and a pair of side panels (51), (52). The front panel (49) has transversely aligned, vertically spaced pairs of holes (53) (FIG. 4) formed therein for receiving the U-bolts (43), and with alternate pairs of holes (54) formed below (FIG. 4) whereby the post (48) can be vertically adjustably mounted on the crossbar (36). The side panels (51, 52) have transversely aligned openings (56) (FIGS. 2 and 5) formed therein, and also transversely aligned, vertically extended slits (57) formed therein such that the opening (56) and slit (57) of each side panel (51), (52) are longitudinally, vertically aligned. Further, a jack screw plate (58) (FIGS. 2 and 5) is secured to the inside of the front panel (49) and extends between the side panels (51), (52) for reasons described hereinafter.

The bracket unit (44) comprises in particular a U-shaped bracket (59) having an upper wall (61) (FIG. 5) and a pair of side walls (62), (63) adapted to embrace the side panels (51), (52) (FIG. 2) of the post (48) such that the bracket (59) is adapted to slide in a telescopic manner longitudinally, and thus vertically, relative to the post (48), the latter fixed to the crossbar (36). The side walls (61), (62) have transversely aligned slots (64) (FIG. 2) formed therein, and also transversely aligned holes (66) formed therein, and such that the slot (64) and hole (66) of each side wall (62), (63) are longitudinally, vertically aligned. By this arrangement, each pair of slots (64) in the bracket (59) are transversely alignable with the transversely aligned openings (56) (FIG. 2) of the post side panels (51), (52), and each pair of holes (66) in the bracket (59) are transversely alignable with the transversely aligned slits (57) of the side panels (51), (52).

A circular guide member (67) (FIG. 5) may be secured to the underside of the bracket upper wall (61) for receiving an element of the jack screw unit (47) and it will be noted the bracket (59) and a supporting plate (68) (FIG. 5) are secured as by fasteners (70) to the clamp element (69) of the bunk unit (22) such that upward or downward movement of the bracket (59) effects like movement of the bunk unit (22) at the area thereof, the bunk unit (22) also being supported to the trailer frame (11) at (39), (41).

The units for fastening the bracket (59) to the post (48) are identical, each comprising a bolt (71) with a threaded shaft (72) passing through the aligned openings (56) and slots (64), and the aligned slits (57) and holes (66), and tightened by a lock washer (73) and nut (74). By this arrangement, it will be seen that upon a loosening of the four sets of fastening units (46), the bracket unit (44) may be movable longitudinally of the post unit (42) without a complete separation of the fastening unit (46).

The jack screw unit (47) comprises a jack screw (76) (FIG. 5) having a head (77) and a shaft (78), the shaft (78) extended through an opening (79) in the plate (58) and threaded through a nut (81) held stationary and against rotation by an enclosure (82) secured by welds (83) to the plate (58), and such that the upper end (84) of the jack screw shaft (78) extends into the guide (67) and engages the inner surface of bracket upper wall (61). Thus by this arrangement, minute adjustments of the position of the bunk unit (22) relative to its height over the crossbar (36) and for support of a boat hull carried by the trailer (10) can be readily and quickly made by merely loosening the fastening units (46); rotating the jack screw (76) in one manner or direction, or the other, whereupon the bracket (59) is either forced upwardly, as viewed, by the jack screw (76) or forced downwardly by the weight of the bunk unit (22); and re-tightening the fastening units (46).

Although the bunk units (22), (23) are shown solidly connected to the upper walls (61) of the bracket units (44), it is readily envisioned that a pivotal mounting of each bunk unit on each wall (61) or other portion of a bracket unit (44) may be provided without affecting the scope of this invention.

I claim:

1. A bunk support assembly for supporting a bunk on a trailer wherein the trailer includes a frame having at least one crossbar, a wheel and axle unit supporting the frame, and a pair of elongated bunks supported on the frame for supporting a boat, the improvement comprising:

post means mounted on the crossbar;
bracket means adjustably mounted on said post means and supporting a bunk;
fastening means connected to said post means and to said bracket means and adapted for longitudinally repositioning said bracket means relative to said post means; and
threaded means mounted on said post means and engageable with said bracket means for incrementally moving said bracket means relative to said post means for adjusting the height of the bunk relative to the frame;
wherein said bracket means includes a U-shaped bracket having an upper wall and a pair of side walls with pairs of transversely aligned slots and holes formed in said side walls;
wherein said post means includes a U-shaped post having a front panel and a pair of side panels, said side panels engaged with said side walls whereby said bracket is slidably movable relative to said post, sad side panels having a pair of transversely aligned slits alignable with said holes, and a pair of transversely aligned openings alignable with said slots.

2. A bunk support assembly as in claim 1, wherein said fastening means are inserted through said aligned slots and openings, and through said aligned holes and slits for releasably connecting said bracket and said post together, whereby upon loosening of said fastening means, said bracket remains slidably movable relative to said post.

3. A bunk support assembly as in claim 2, wherein said threaded means includes further a plate unit secured between said post side panels, and a jack screw threaded through said plate unit whereby rotation of said jack screw effects movement of said jack screw relative to said plate unit.

4. A bunk support assembly as in claim 3, wherein said support means includes a guide unit secured to said upper wall and adapted to receive an end of said jack screw whereby rotation in one manner of said jack screw in combination with a loosening of said fastening means effects movement of said bracket in one direction relative to said post, and whereby rotation of said jack screw in another manner in combination with said loosening permits movement of said bracket in another direction relative to said post, and effecting like movement of the bunk connected to said bracket means relative to the trailer frame.

* * * * *